Jan. 1, 1957  J. H. WORTHEN  2,775,820
CENTRALIZING MECHANISM FOR A BORE GAUGE
Filed May 12, 1954  3 Sheets-Sheet 1
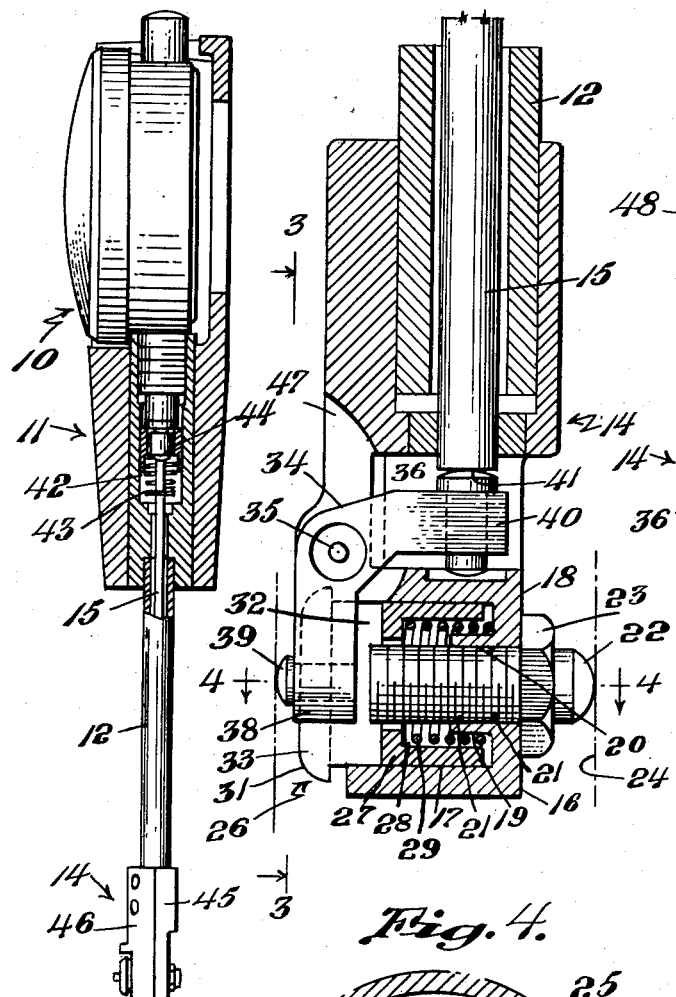
INVENTOR.
John H. Worthen
BY
Barlow & Barlow
ATTORNEYS.

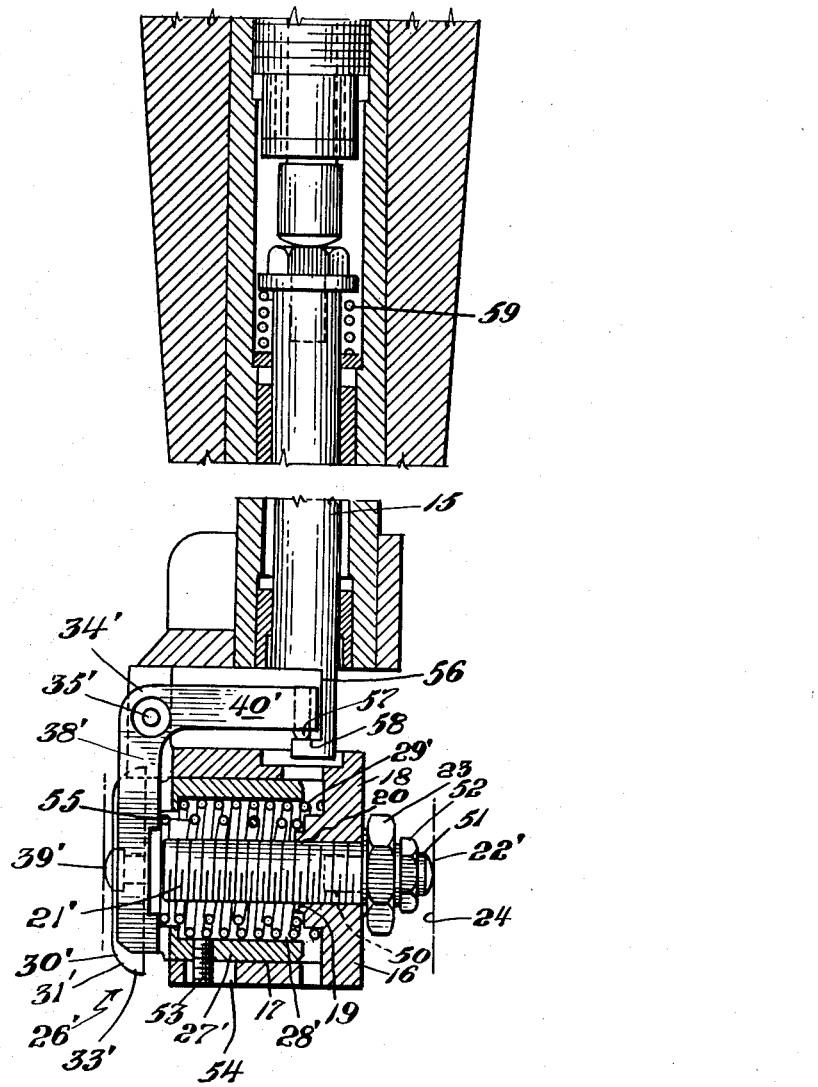

Jan. 1, 1957  J. H. WORTHEN  2,775,820
CENTRALIZING MECHANISM FOR A BORE GAUGE
Filed May 12, 1954  3 Sheets-Sheet 3
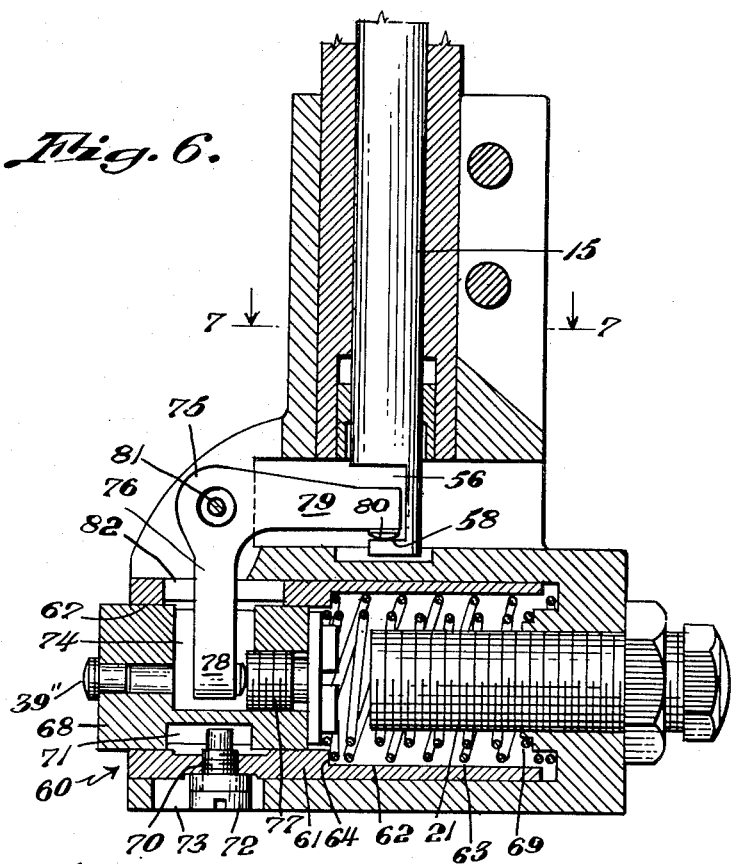
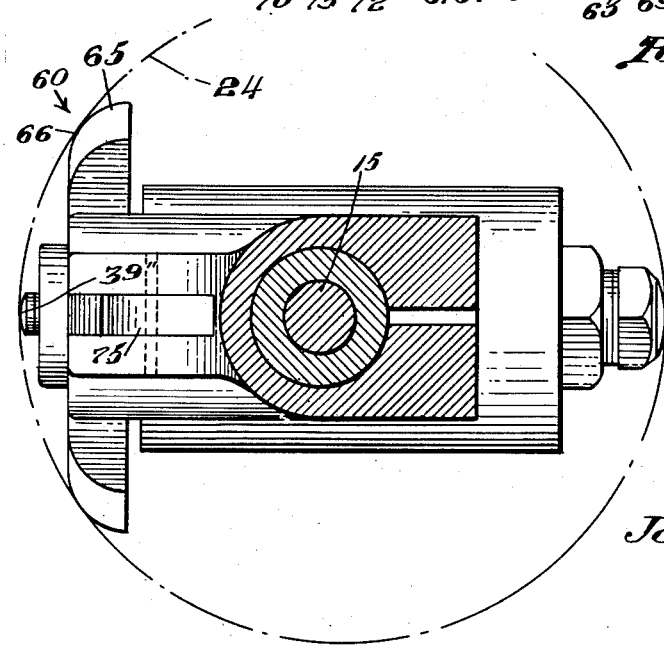
INVENTOR.
John H. Worthen
BY
Barlow & Barlow
ATTORNEYS.

United States Patent Office 2,775,820
Patented Jan. 1, 1957

2,775,820

CENTRALIZING MECHANISM FOR A BORE GAUGE

John H. Worthen, Warwick Neck, R. I., assignor to Federal Products Corporation, a corporation of Rhode Island Application May 12, 1954, Serial No. 429,313

4 Claims. (Cl. 33—178)

This invention relates to a bore gauge such as would be used for determining the diameter or relative diameters of a bore such as may exist in the block of an engine, or it may have various other uses.

In setting up bore gauges, an accurate measurement is frequently obtained by adjusting the gauge between parallel surfaces rather than along arcuate surfaces such as may exist in a bore, and in so setting up the gauge, it is desirable to have a maximum of control of centralization with reference to the points which contact the work.

One of the objects of this invention is to provide an arrangement of moving parts so that the contact points are all arranged along the same axis.

Another object of the invention is to so arrange the parts of the measuring mechanism as to have a maximum control over centralization of the gauge with reference to the measuring contacts.

Another object of the invention is to provide the motion transmitting mechanism in the same plane as the axis between the measuring contacts which engage the work.

Another object of the invention is to provide a casing which will house the moving parts and is such that even though it is grasped by the hand, the heat of the hand will not be transmitted in such a way as to affect the measuring of the instrument.

With these and other objects in view, the invention consists of certain novel features of construction as will be more fully described and particularly pointed out in the appended claims.

In the accompanying drawings:

Figure 1 is a side view partly in section of a dial gauge equipped at its lower end with a measuring device in accordance with this invention;

Figure 2 is a sectional view on a much larger scale of the lower portion of the instrument shown in Figure 1;

Figure 3 is a side elevation on substantially line 3—3 of Figure 2;

Figure 4 is a sectional view on line 4—4 of Figure 2;

Figure 5 is a sectional view similar to Figure 2 of a modified construction;

Figure 6 is a sectional view similar to Figure 2 of a still different modification; and Figure 7 is a sectional view on substantially line 7—7 of Figure 6.

In the above-described views the construction shown in Figures 1-4 is that used in practice for a gauge having a range of from ½" to 1". Figure 5 is a construction used for a gauge having a range of from 1" to 2", and Figures 6 and 7 is the construction used in a gauge having a range of from 2" to 4". The general principle of the invention is utilized for all of these constructions, but in the smaller size there is insufficient room for two springs to operate the parts, and therefore the spring which operates the plunger for transmitting motion to the dial indicator is utilized for moving the sensitive contact member away from the reference contact member. Throughout all of the views, however, I have maintained a concentricity of contact points with reference to a fixed axis and thus provide measurement along a center line and a centralization of that center line with reference to the work which is being measured.

With reference to the drawings, particularly Figures 1-4, the bore gauge comprises a dial indicator 10 supported in a housing 11 with a stem 12 extending downwardly therefrom to a feeler mechanism 14, motion being transmitted through the stem by a plunger 15. My invention has more to do with the feeler mechanism designated generally 14 which as shown in greater detail in Figure 2 comprises a frame 16 having a bore 17 opening to the left, as shown in Figure 2, and leaving a wall 18 and a collar 19. A smaller bore 20 extends through this collar 19 and the wall 18 and is concentric with the axis of the bore 17. The reference contact member 21 threadedly engages this bore 20 and has its axis concentric with the bore 17. The outer surface of this reference contact member is arcuate along the surface of a sphere as at 22 and is adjustable in the frame 16 for setting up the gauge for measuring bores within the range of the gauge. The contact 21 is held in adjusted position by the nut 23. This surface 22 will engage the inner surface 24 of the bore of a work piece 25, as seen more clearly in Figure 4.

A centralizing device which may be designated generally 26 comprises a cylindrical member 27 of a size to closely fit and slide in the bore 17. It is circularly recessed as at 28 to receive one end of a spring 29 the other end of which encircles and is guided by the collar 19 so as to engage the ends of recesses 17 and 28, tending to force the centralizing member outwardly away from the reference contact member 21.

This centralizing device is provided with a head 30 at its outer end of a size larger than the cylindrical portion 27 with its outer edges arcuate as shown at 31. The arcuate edges are formed on a plurality of radii whose centers define a circle concentric with and the plane of which is perpendicular to the axis of the reference and measuring contact members so that the points of work contacted by this head will all be concentric with this axis which can be arbitrarly called a measuring axis. Thus, the points of contact along the surface 31, as shown in Figure 4, will form a family of chords which will perpendicularly bisect the measuring axis through the reference contact member. This centralizing device is also provided with an opening, which in this case is a slot 32, presenting parallel surfaces 33 equally distant from the measuring axis and parallel to a plane passing through this axis and the axis of the plunger 15. This slot will pass through the head as well as the body portion 27 of the centralizing device. A bell crank lever 34 is pivoted as at 35 in a slot 36 of the frame 16 and has parallel surfaces 37 which closely fit but are slidably guided in the slot 32. One arm 38 of this bell crank lever carries a sensitive contact member 39 which is fixed thereto such as by a press fit, and this sensitive contact member also has an arcuate surface along a portion of a sphere for contacting the diametrically opposite side of the bore 24 of the work 25. By this arrangement the contact will be directly on the measuring axis during the major portion of its measurement. Even though it swings slightly through a very short distance, the contact will always be in a plane passing through the measuring axis.

The other arm 40 of the bell crank lever 34 is provided with a fixed arcuate headed button 41 which engages the plunger 15 extending through the stem 12. This plunger is forced downwardly by spring 42 engaging washer 43 fixed to the plunger 15, which plunger in turn engages a plunger 44 of the dial indicator which follows the plunger 15 and operates the pointer of the indicator mechanism. Thus, the spring 42 forces the sensitive contact member 39 away from the reference contact member 22. A casing consisting of two parts 45 and 46 is secured about the mechanism just described with openings in the casing such as 47 to permit the operating parts to extend therethrough. These parts 45 and 46 of the casing may be secured together in place by screws 48. By reason of this casing if one handles the lower part of the mechanism, heat from the hand is not transmitted to any of the working parts to detrimentally affect the same.

In Figure 5 I have shown a somewhat modified mechanism by reason of the larger size of the gauge. The frame 16 is the same as before with a bore 17 leaving a bottom wall 18 and a collar 19. A bore 20 extends through the collar and bottom wall and receives a reference contact member 21' which is threaded through the opening 20 and may be held in adjusted position by the check nut 23. It has a threaded bore 50 to receive a separate member 51 which is threaded thereinto and held in position by check nut 52. This presents a contact surface 22' for engagement with the bore 24 of the work.

The centralizing device designated 26' has a cylindrical portion 27' which closely fits and is slidable in the bore 17. It is held against rotation by a pin 53 which is threaded into this cylindrical portion 27' and slides in a slot 54 in the frame 16 so as to prevent rotation of this centralizing device. The centralizing device is provided with a recess 28' which receives a spring 29' to force the centralizing device away from the reference contact surface 22'. The centralizing device is provided with a head 30' of a size larger than the cylindrical portion 27' and which presents arcuate surfaces 31' for contact with the bore to be measured. These contact surfaces 31' are arranged so that they will be concentric with the measuring axis. The centralizing device is slotted so as to present parallel surfaces 33' equally distant from the axis of the reference contact member and parallel to a plane passing through this axis and the axis of the plunger 15. A bell crank lever 34' is pivoted as at 35' and is of a size to closely fit between and be guided by the surfaces 33' of the centralizing device. The slot which presents the surfaces 33' is cut sufficiently deep so as to intersect the recess 28', and a spring 55 engages the collar 19 and passes through this opening between the slot and the recess 28' to engage the arm 38' of the bell crank lever so as to force it outwardly and away from the contacting surface 22'. This lever carries the sensitive contacting member 39' which has a press fit with the arm 38'. The other arm 40' of this bell crank lever extends into a recess 56 in the plunger 15 so that the arcuate surface button 57 carried by the arm 40' will engage the surface 58 of this recess. In this case a spring 59 forces the plunger 15 upwardly so that as the sensitive contact 39 is moved inwardly against the action of the spring 55, it will lift from the surface 58, allowing the spring 59 to lift the plunger 15 and transmit motion to the dial indicator in the manner above indicated. It will, of course, be apparent that the spring 55 must be of greater strength than the spring 59 in order that this may be accomplished.

In the form of the invention shown in Figures 6 and 7, a still larger size of instrument is illustrated and one having a larger range. In this case it is desirable that the bell crank lever not carry the sensitive contacting member, and accordingly the centralizing device designated generally 60 is provided with a cylindrical part 61 which has a recess 62 in which a spring 63 is located to engage the shoulder 64 and press the centralizing device outwardly. The outer end of the centralizing device is provided with a head 65 having arcuate portions 66 presenting concentric points of engagement with the bore 24 of the work.

This centralizing device is also provided with a cylindrical bore 67 which is concentric with the measuring axis and which receives a plug 68 which carries the reference contact point 39" having an arcuate surface to engage the bore of the work and which has a press fit with the plug 68. It is located centrally of the plug and has its outer arcuate surface on the same axis as the axis of the reference contact member 21. This plug is forced outwardly by spring 69 which is concentric with the spring 63. A screw 70 is threaded through the centralizing device 61 and has one end located in a slot 71 of the plug, while its head 72 is located in a slot 73 in the frame. The walls of the slots and the opposite ends of this screw slidingly engage so as to prevent relative rotation of the frame of the centralizing device and the plug 68, while permitting relative sliding movement. The plug 68 is provided with a slot 74 and also the centralizing member is slotted as at 82. Both of these slots have their sides parallel and receive one arm 76 of the bell crank lever 75 which closely fits in this slot. A screw abutment 77 is threaded in the plug 68 and forms an abutment which may be adjusted for the relative position of the member 78 carried by the arm 76. The other arm 79 of this bell crank lever carries a button 80 which engages a surface 58 of the plunger 15, which is cut out as at 56 similar to that shown in Figure 5 and similarly operable. Bell crank lever 75 is pivoted as at 81 and is centralized so that a plane passing through the axis of the plunger 15 and the axis of the contact members will pass through the center of the pivot 81 and the pivot will be at right angles to this plane.

I claim:

1. In a gauge, a frame having a bore therein, a reference contact member secured to the frame with its work contacting surface on the axis of said bore, a centralizing device having a cylindrical portion closely fitting and slidable in said bore in telescopic relation therewith, and a head at its outer end presenting work contacting surfaces at diametrically opposite sides of and along a circle concentric with said axis, a spring within said bore to urge said device away from said reference contact member, said centralizing device having an opening therein presenting guiding surfaces on opposite sides of said axis and equally distant therefrom, and a sensitive contact member having a work contacting surface guided by said guiding surfaces of said opening to maintain said sensitive contacting surface in a plane passing through said bore axis and means to transmit the relative movement of said contact members to an indicator.

2. In a gauge, a frame having a bore therein, a reference contact member secured to the frame with its work contacting surface on the axis of said bore, a centralizing device having a cylindrical portion closely fitting and slidable in said bore, and a head at its outer end presenting work contacting surfaces at diametrically opposite sides of and along a circle concentric with said axis, a spring to urge said device away from said reference contact member, said centralizing device having a slot therein presenting guiding surfaces on opposite sides of said axis and equally distant therefrom, a sensitive contact member having a work contacting surface, and a bell crank lever connected to said sensitive member and guided in said slot and transmitting movement of said sensitive member to an indicator.

3. In a gauge as in claim 2 wherein said lever carries said contact member.

4. In a gauge as in claim 2 wherein said lever is independent of and movable with reference to said contact member.

References Cited in the file of this patent

UNITED STATES PATENTS

| | | |
|---|---|---|
| 2,337,509 | Todd | Dec. 21, 1943 |

FOREIGN PATENTS

| | | |
|---|---|---|
| 767,651 | France | July 23, 1934 |
| 238,163 | Switzerland | Oct. 1, 1945 |
| 919,352 | France | Mar. 6, 1947 |